A. C. TOWER.
Machines for Pulverizing Soil.
No. 138,301.  Patented April 29, 1873.
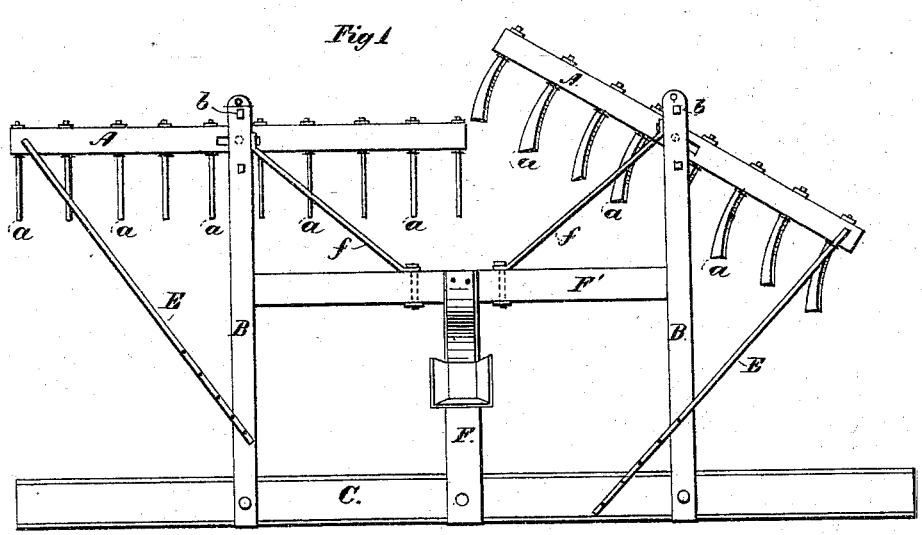
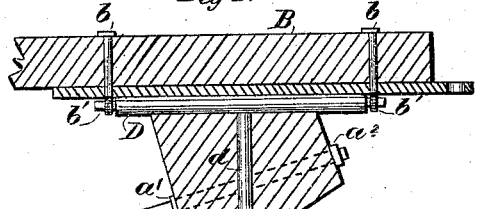
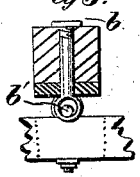
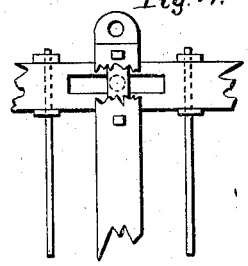
Witnesses:
Harris C. Clark
R. N. Dyer
Inventor.
A. C. Tower
by Dyer, Beadle & C.
Attys.

UNITED STATES PATENT OFFICE.

AUGUSTUS C. TOWER, OF MENDOTA, ILLINOIS.

IMPROVEMENT IN MACHINES FOR PULVERIZING SOIL.

Specification forming part of Letters Patent No. 138,301, dated April 29, 1873; application filed December 12, 1872.

*To all whom it may concern:*

Be it known that I, AUGUSTUS C. TOWER, of Mendota, in the county of La Salle and State of Illinois, have invented a new and useful Machine for Pulverizing Earth; and I do hereby declare that the following is a full and exact description of the same, reference being had to the accompanying drawing and to the letters of reference marked thereon.

This invention is an improvement upon my patent of August 20, 1872; and consists mainly in attaching the front or knife-carrying beams to the frame-work in such a manner that they may be adjusted at different angles to the line of draft, and also that they may be capable of self-adjustment to the unevenness of the ground over which they pass. It further consists, also, in certain details of construction, which will be fully described hereinafter.

In the drawing, Figure 1 represents a plan view of my improved machine; Figs. 2 and 3, elevations of detached parts; and Fig. 4 represents a partial-plan view of one of the side beams and knife-beams enlarged.

To enable others skilled in the art to make and use my invention, I will now proceed to fully describe its construction.

A A represent the front beams, consisting of any proper material, and of any suitable size, which are provided with the series of curved cutting-knives $a$ $a$, preferably of steel, each of which is secured to the beam by means of a shank having a shoulder, $a$, Fig. 2, and nut and washer $a^2$, as shown, which means of fastening permits the knives, as regards their lateral lines, to be adjusted and held at any desired angle with the surface of the ground. B B represent the side beams of the frame-work of the machine, by means of which the knife-carrying beams A A are connected to the rear beam C, as shown in Fig. 1. Each beam B is provided at its front end with two bolts, $b$ $b$, which have at their lower ends eyes or rings $b'$, in which rest the ends of the bar or rod D, provided with a central bolt, $d$, secured at right angles thereto, as shown in Fig. 2. The bolt $d$ rests in a central orifice in the beam A, and is secured thereto by means of a threaded nut at its lower end, as shown. The orifice in which the bolt rests is slotted, as shown in Fig. 4, for the purpose of permitting the beams A A to be moved to one side when it is desired to turn them at an angle, so that the knives at the inner edge of the beams may not clash with each other. E E represent adjusting-rods, which are fastened at one end to one end of the beams A A, and are adjustably secured at the other by means of a series of holes to a suitable part of the frame-work. F F' represent portions of the frame-work, and $ff$ suitable brace-rods. The beam C is constructed in a similar manner to the corresponding beam in my patent above referred to.

The operation of my improved machine is as follows: It is drawn over the field in the usual manner, the knives operating to cut and stir the earth, and the rear beam to pulverize it. The manner of attaching the front beams to the side beams makes them capable of adjustment at any desired angle to the line of draft within the limits of the machine, the beam being readily turned upon its central bolt by means of its adjusting-rod. The attachment is such, also, that the beams are capable of adjusting themselves to the unevenness of the ground over which they pass, this result being accomplished by the movement of the rod D in its bearings.

The described construction is especially advantageous, because the beams may be set at such an angle as will insure the complete stirring of the earth and its perfect pulverization. It is also advantageous because by means of it the machine conforms readily to the surface of the ground, whatever it may be.

Having thus fully described my invention, what I claim as new, and desire to secure by Letters Patent, is—

1. The combination of the beams A A with the side beams B B, the beams A A being capable of adjustment to the line of the draft, and also to the unevenness of the ground, substantially as described.

2. The combination, in a pulverizing-machine, of knife-carrying beams capable of double adjustment, adjusting-rods, and a pulverizing-beam, substantially as described.

This specification signed and witnessed this 7th day of December, 1872.

AUGUSTUS C. TOWER.

Witnesses:
L. B. CROOKER,
R. F. SHIPLEY